Sept. 29, 1925.

J. J. MORAND 1,555,479

CUSHION WHEEL

Filed March 8, 1920

Inventor:
Joseph J. Morand,
By Dyrenforth, Lee, Chritton & Wiles
Att'y

Patented Sept. 29, 1925.

1,555,479

UNITED STATES PATENT OFFICE.

JOSEPH J. MORAND, OF CHICAGO, ILLINOIS, ASSIGNOR TO MORAND CUSHION WHEEL CO., OF CHICAGO, ILLINOIS, A CORPORATION OF ILLINOIS.

CUSHION WHEEL.

Application filed March 8, 1920. Serial No. 364,195.

*To all whom it may concern:*

Be it known that I, JOSEPH J. MORAND, a citizen of the United States, residing at Chicago, in the county of Cook and State of Illinois, have invented a new and useful Improvement in Cushion Wheels, of which the following is a specification.

This invention relates particularly to cushion wheels adapted for motor-vehicle use; and the primary object of the invention is to provide a simple construction which can be manufactured at reduced cost, which can be assembled with great facility, and which will operate to subject the elastic cushion-element employed between the tire and wheel to compressive and distensive elastic action throughout the circumference of the structure.

The invention is illustrated, in its preferred embodiment, in the accompanying drawing, in which—

Figure 1:
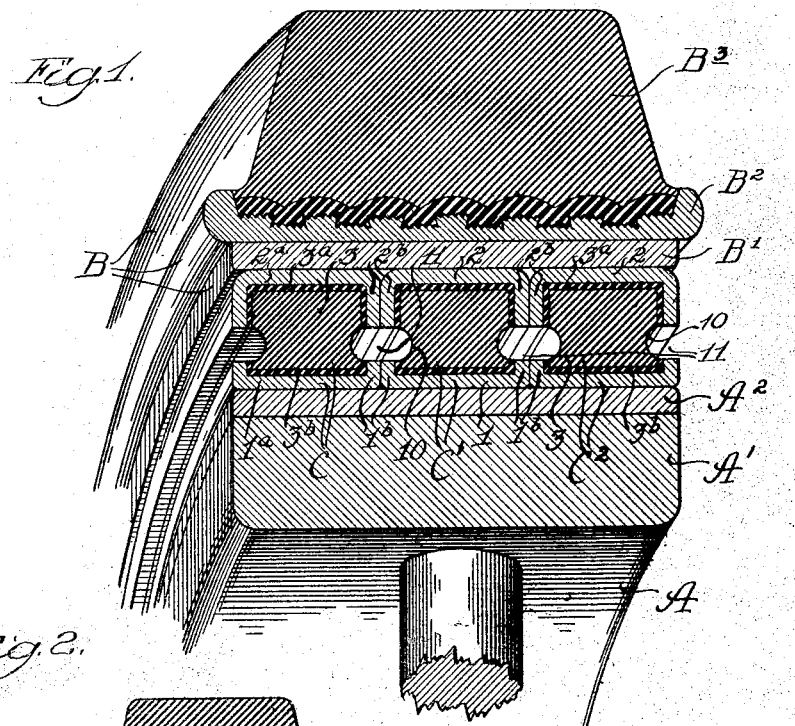
Figure 2:
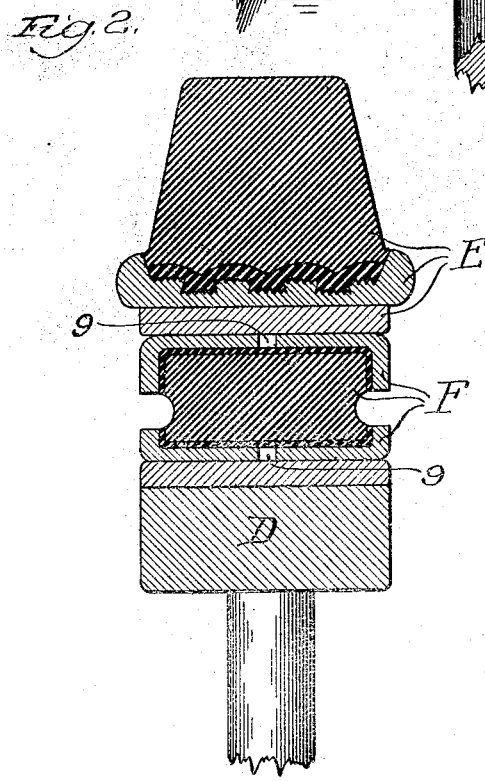

Fig. 1 represents a broken perspective view of a cushion wheel embodying the invention in a form where a plurality of cushion-units are employed between the tire and wheel; Fig. 2, a broken sectional view of a wheel embodying the invention in a form where a single cushion-unit is employed; and Fig. 3, a sectional view illustrating the method by which the cushion elements employed are manufactured.

Referring to Figure 1, A represents a wheel having a felly A' encircled by a steel band $A^2$; B, a tire shown as comprising a steel band B', and an outer tire base $B^2$ having a rubber tire element $B^3$; and C, C' and $C^2$, a plurality of cushion-units confined between the tire and wheel.

The wheel A may be of any suitable construction. It is preferred, however, to equip the felly A' with a steel band, as shown.

The tire B may be of any suitable construction. The rubber element $B^3$ is vulcanized to the annular steel base $B^2$ in the usual manner. It is preferred, also, to reinforce the member $B^2$ by means of the heavy steel band B' which is forced in the member $B^2$ under a pressure of many tons.

The tire-units C, C' and $C^2$ are self-contained units, and are disposed side by side in the space between the tire and circumference of the wheel. These units preferably are of a width of about two inches. This may be varied, however. At present, the larger size wheels are made with a felly as wide as 14 inches; and in such case, it may be desirable to employ as many as seven of the cushion-units in a wheel.

Each of the cushion-units comprises an inner cushion-rim 1 which is frictionally held in the wheel; an outer cushion-rim 2 which is frictionally held in the tire; and a rubber cushion-element 3 which has its inner circumferential portion vulcanized to the inner cushion-rim, and which has its outer circumferential portion vulcanized to the outer cushion-rim. In the illustration given, the cushion-rims are of channel-form cross-section. Thus, the rim 1 has a cylindrical, or web-portion, $1^a$, and side flanges $1^b$. So also, the cushion-rim 2 has a web-portion $2^a$ and the side flanges $2^b$. The rubber cushion-element 3 has its main body composed of soft elastic rubber, which is capable of being compressed and stretched. The surface portions $3^a$ and $3^b$ where the rubber unites with the cushion-rims are composed of a hard rubber compound. In the vulcanizing process, the hard rubber is vulcanized simultaneously with the soft rubber, and is vulcanized to the cushion-rims and to the soft rubber body at the same time.

Figure 3:
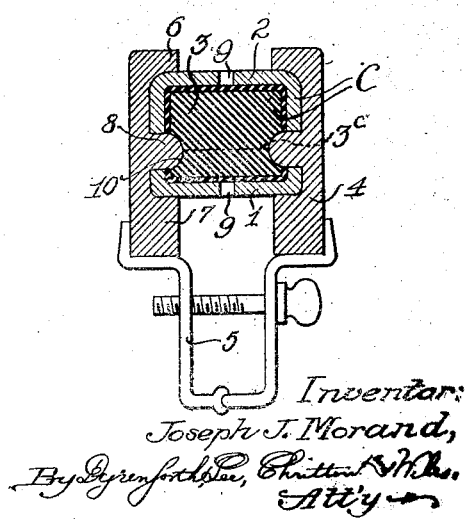

The method of forming the cushion-unit C, for example, is illustrated in Fig. 3. The cushion-rims 1 and 2 are filled with or have applied thereto the rubber compound, usually in the form of strips. Each channel may be filled with strips to or slightly beyond the meeting plane, indicated by the dotted line $3^c$, the strips in each channel being caused to adhere to each other by rubber cement, if desired; the exposed surfaces may then be washed with gasoline, and the inner cushion-rim and its contents inserted into the outer cushion-rim and its contents; annular mold-sections 4 may then be applied to the cushion-rims and held together by suitable clamps, such as 5. The cushion-rims may be regarded as affording walls of a mold for the vulcanizing process; and the mold-sections 4 provide removable annular side plates which are provided with flanges 6 and 7 which embrace the circumferential portions of the cushion-rims. The mold-sections 4 are provided with annular beads, or ribs, 8, which extend between the flanges of the cushion-rims and place the rubber under a certain amount of compression. The web-portions of the cushion-rims are provided at intervals throughout their circumference with perforations 9, which permit the escape of gases in the vulcanizing process. The cushion-units, held in molds as described, are placed in a vulcanizer and subjected to the usual vulcanizing operation. It is preferred to cleanse the metal of the cushion-rims by an acid solution and brass-plate the inner surfaces of the channels before introducing the rubber compound into the rims. This provides for an intimate vulcanization of the rubber to the rims.

The cushion-units, formed as described above, are forced onto the wheel under pressure of many tons, and are frictionally held on the wheel. The tire is then forced on to the cushion-units under a pressure of many tons, and thus the cushion-units are frictionally held within the tire. It will be understood that no substantial compression of the rubber is effected in assembling the parts of the cushion-wheel structure. The result of the assembling operation is to securely fasten the inner cushion-rims to the wheel and to securely fasten the outer cushion-rims to the tire. Thus, the inner cushion-rims virtually become an integral part of the wheel, while the outer cushion-rims virtually become an integral part of the tire.

In the use of the cushion-wheel, when the wheel center is depressed, the result is, owing to the substantial inflexibility of the tire, to place the cushion-elements under elastic action throughout the entire circumference of the structure. The elastic action is of a compressive character mainly throughout the lower portion of the wheel, and of a distensive character mainly throughout the upper portion of the wheel. Thus, it will be understood that the cushion-wheel is well adapted to withstand heavy shocks and dissipate the stresses, by distributing them throughout the circumference of the wheel structure. Also, it will be understood that the wheel is well adapted to withstand side stresses, such as develop in rounding a corner, striking against curbs, or the like.

The beads 8 of the mold-sections form annular lateral channels 10 in the rubber cushion-elements; and these lateral recesses, supplemented by the spaces 11, between the flanges of the inner and outer cushion-rims, afford annular air spaces between the cushion-units, as will be evident from the assembled structure shown in Fig. 1. The formation of the annular lateral recesses 10 also serves to reduce or weaken the intermediate portions of the cushion-elements, thereby tending to permit a freer elastic action.

In the construction shown in Fig. 2, D represents the wheel; E, the tire; and F, the cushion-unit. The construction is similar to that already described, except that the tire and the felly of the wheel are comparatively narrow, and a single cushion-unit F is employed.

It is preferred to provide the outer cushion-rims with deeper flanges than are employed in connection with the inner cushion-rims. These flanges serve to reinforce the tire and prevent buckling or bending. Inasmuch as the inner cushion-rim is backed by the heavy felly and spokes of the wheel, the flanges of the inner cushion-rim may be rudimentary, or even omitted. On the other hand, it is desirable to employ substantial flanges in connection with the outer cushion-rims to reinforce the tire. It will be noted from the assembly in Fig. 1 that the tire is substantially reinforced by the flanges which lie in radial planes, the tire and outer cushion-rims affording a substantially inflexible structure.

It has been demonstrated that in cushion-units formed in the manner described, the rubber is so vulcanized to the cushion-rims as to adhere thereto with intense tenacity, the bond being such as to withstand all strain which it is possible to exert through the elastic rubber. Inasmuch as the rubber elements are bonded throughout their entire circumferential portions to the cushion-rims, it will be understood that elastic action is exerted at every point where the rubber is under tension, as well as at every point where the rubber is under compression.

The improved wheel can be manufactured at moderate cost, can be assembled with great facility in a properly equipped factory, and is thoroughly adapted to its purpose.

It will be noted that the construction dispenses wholly with the use of bolts, the self-contained cushion-units being held by intense frictional force upon the wheel and within the tire, and the rubber cushion-elements being bonded by the vulcanizing process to the cushion-rims of said units.

It may be added that the channel-form cushion-rims are rounded at the corners to facilitate the assembling operation. Preferably, this is true, also, of the bands $A^2$ and $B'$ at the annular corners past which the cushion-rims must slip in the assembling operation.

The foregoing detailed description has been given for clearness of understanding only, and no unnecessary limitation should be understood therefrom, but the appended claim should be construed as broadly as permissible, in view of the prior art.

What I regard as new, and desire to secure by Letters Patent, is:

The combination of a wheel having a wide felly, a relatively large tire encircling said wheel and comprising a wide steel band, and a plurality of self-contained annular cushion-units disposed side by side in the space between said wheel and tire, each cushion-unit comprising an endless inner cushion-rim rigidly secured on the wheel, an endless outer cushion-rim rigidly secured in the tire, and an annular rubber cushion-element vulcanized at its outer circumferential portion to said outer cushion-rim and at its inner circumferential portion to said inner cushion-rim, said tire and said outer cushion-rims affording a substantially inflexible structure, whereby the rubber cushion-elements will be subjected, in use, to compressive and distensive elastic action throughout the circumference of the structure, the adjacent sides of said rubber cushion-elements having therein annular lateral recesses, affording annular air chambers between said cushion-units.

JOSEPH J. MORAND.